United States Patent

Mannlein et al.

[11] Patent Number: 5,944,165
[45] Date of Patent: *Aug. 31, 1999

[54] LANE DISTRIBUTION APPARATUS

[75] Inventors: Dean Joseph Mannlein, Joppa; Thomas Gerard Power, Sparks, both of Md.

[73] Assignee: Lever Brothers Company, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/629,452

[22] Filed: Apr. 10, 1996

Related U.S. Application Data

[63] Continuation of application No. 08/432,758, May 2, 1995, abandoned.

[51] Int. Cl.[6] ................................................. B65G 47/26
[52] U.S. Cl. ...................... 198/442; 198/367; 198/369.1
[58] Field of Search ..................... 198/442, 452, 198/367, 369.1, 370.08, 437

[56] References Cited

U.S. PATENT DOCUMENTS

| | | |
|---|---|---|
| 1,824,413 | 9/1931 | Stein . |
| 2,451,104 | 10/1948 | Lowe . |
| 2,627,334 | 2/1953 | Koppel et al. . |
| 3,193,078 | 7/1965 | Amenta et al. . |
| 3,326,349 | 6/1967 | Pettis et al. ........................ 198/442 X |
| 3,397,779 | 8/1968 | Wilder . |
| 3,599,789 | 8/1971 | Kurczak . |
| 3,822,006 | 7/1974 | Shuttleworth ........................ 198/442 X |
| 3,830,359 | 8/1974 | Fogelberg . |
| 4,003,465 | 1/1977 | Bauer ........................................ 198/442 |
| 4,051,964 | 10/1977 | Meijer ................................. 198/442 X |
| 4,060,165 | 11/1977 | Bauer ........................................ 198/442 |
| 4,066,163 | 1/1978 | Rowekamp ........................ 198/442 X |
| 4,147,248 | 4/1979 | Kurczak et al. ..................... 198/442 X |
| 4,296,590 | 10/1981 | Focke . |
| 4,616,745 | 10/1986 | Hartness .................................. 198/442 |
| 4,723,649 | 2/1988 | Hartness et al. ........................ 198/442 |
| 4,779,715 | 10/1988 | Pazdernik . |
| 4,830,173 | 5/1989 | Hartness et al. . |
| 5,115,902 | 5/1992 | Snyder et al. . |
| 5,174,430 | 12/1992 | Ebira ................................... 198/442 X |
| 5,186,306 | 2/1993 | Sjöstrand ................................. 198/442 |
| 5,411,129 | 5/1995 | Crouch .................................... 198/442 |
| 5,603,398 | 2/1997 | Crouch .................................. 198/459.2 |

FOREIGN PATENT DOCUMENTS

| | | | |
|---|---|---|---|
| 678711 | 9/1966 | Belgium . | |
| 2358771 | 6/1975 | Germany ................................ 198/442 |
| 2402145 | 7/1975 | Germany ................................ 198/442 |

*Primary Examiner*—Karen M. Young
*Assistant Examiner*—Thuy V. Tran
*Attorney, Agent, or Firm*—Gerard J. McGowan, Jr.

[57] ABSTRACT

A lane distribution apparatus for distribution of articles in a single lane to multiple lanes. A rocker plate and associated rocker arms are used to shift simultaneously lanes both upstream and downstream of a distribution point. The apparatus and process permits lane changes in a short period of time, which minimizes the risk of product stoppage and maximizes the speed with which products can be conveyed.

9 Claims, 2 Drawing Sheets

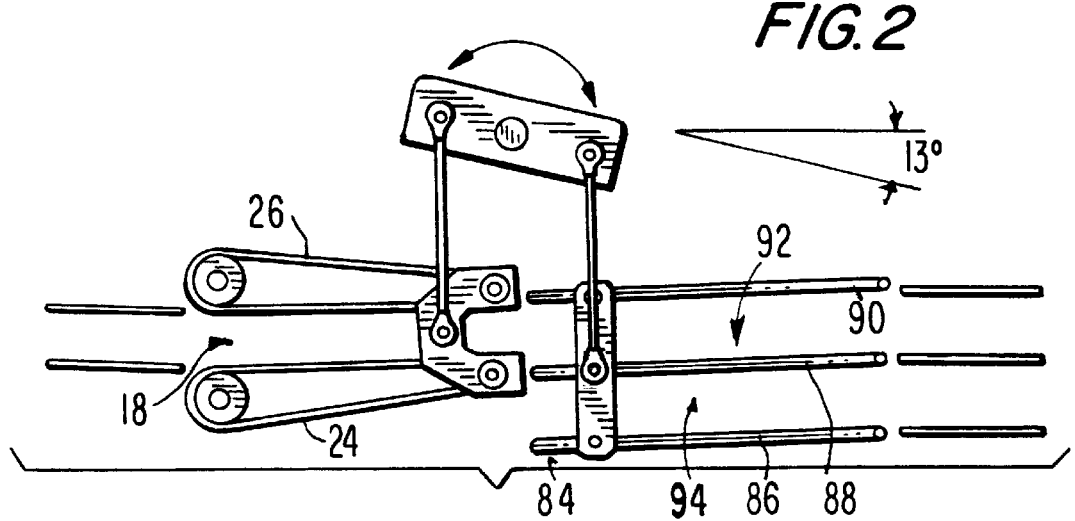
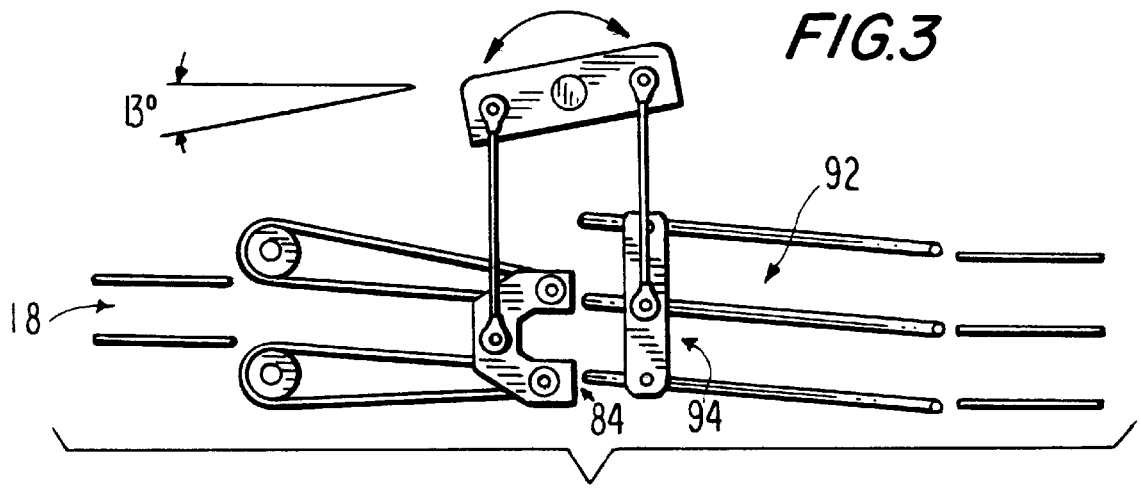
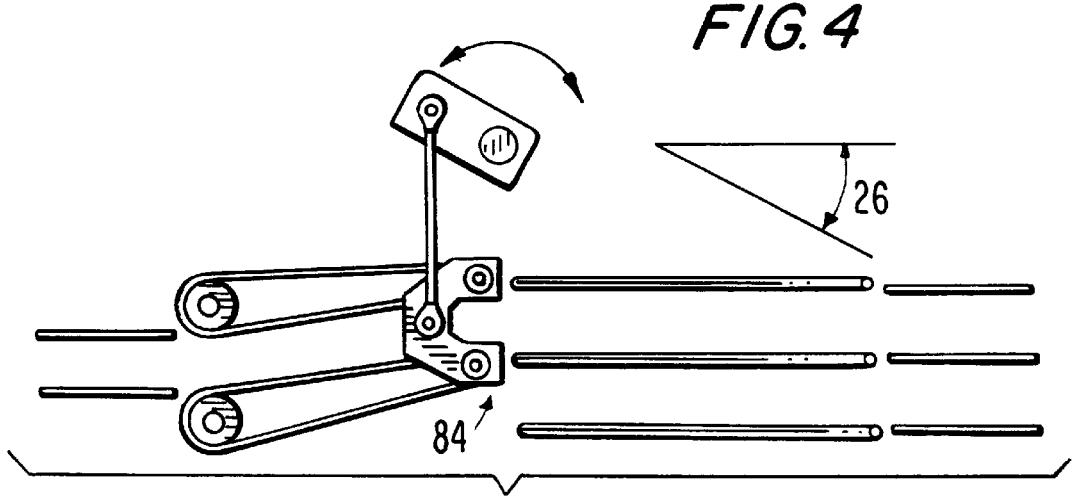

LANE DISTRIBUTION APPARATUS

This is a continuation application of Ser. No. 08/432,758, filed May 2, 1995 now abandoned.

BACKGROUND OF THE INVENTION

In the course of manufacture of goods, it is often desirable to distribute a single lane of goods into two or more lanes to be packaged, crated or otherwise finished. It will be appreciated, however, that the process of dividing a single lane of product into two or more lanes is a potential trouble spot in a manufacturing line. It is desirable that dividing of the lane occur without a substantial decrease in the speed at which products are conveyed. On the other hand, the transition from one line to multiple lines must be effected smoothly, so as to minimize the risk of a stoppage due to failure of a product to negotiate the change in lanes successfully.

In the past, lane distribution mechanisms have included an upstream lane, two downstream lanes, and a mechanism to change the angle of the upstream lane in a region proximate the two downstream lanes so as to permit a movable end of the upstream lane to be positioned to feed into either of the two downstream lanes. Such arrangements, unfortunately, do not permit conveyance of the articles as quickly as desired without unduly increasing the risk of a blockage due to failure of the article to make the turn in the transition between the upstream single lane and the two or more downstream lanes.

APV Douglas (Alexandria, Minnesota) manufactures a lane divider which employs a servo motor to move a single set of swing arms to divide product into multiple lanes. The swing arms must move one complete width of the lane when it is desired to change lanes. In a modern manufacturing facility it is important to minimize strictly the time required to change the position of the movable region of the single lane since this requires a stoppage or slowing of the product.

The following U.S. patents illustrate various lane arrangements:

Ebira U.S. Pat. No. 5,174,430; Hartness et al. U.S. Pat. No. 4,830,173; Pazdernik U.S. Pat. No. 4,779,715; Hartness et al. U.S. Pat. No. 4,723,649; Focke U.S. Pat. No. 4,296,590; Kurczak et al. U.S. Pat. No. 4,147,248; Fogelberg U.S. Pat. No. 3,830,359; Shuttleworth U.S. Pat. No. 3,822,006; Kurczak U.S. Pat. No. 3,599,789; Amenta et al. U.S. Pat. No. 3,193,078; Koppel et al. U.S. Pat. No. 2,627,334; Lowe U.S. Pat. No. 2,451,104.

Stein U.S. Pat. No. 1,824,413 illustrates a double belt cigarette collector which includes a mechanism for seizing cigarettes and forwarding them at a given speed and delivering them to alternative separated positions, together with means for forwarding the cigarettes from the separated positions at reduced speeds.

Bauer U.S. Pat. No. 4,060,165 is directed to a diverter for distributing articles supplied in one line among a plurality of conveying tracks. The Bower apparatus includes lateral guides bounding a passage for the articles to be distributed, which guides are pivotable about a vertical axis disposed in their inlet region, and a switching gear which is rotatable about a vertical axis mounted on one of the lateral guides and which projects into the passage formed by the guides. The switching gear is advanced by one tooth by each passing article. A steering member is pivotably mounted on a crank driven by the switching gear and the other end of the steering member is pivotable about a stationary vertical axis so that the free end of the passage formed by the guides swings between the conveying tracks upon rotation of the switching gear. In FIGS. 3–7 showing successive distribution positions, both upstream and downstream lanes appear to change position.

The object of the Bauer patent is to provide a distributing apparatus having a high throughput and with which articles of any desired shape can be distributed without difficulty among a plurality of conveying tracks. In the Bauer apparatus the interpositioning of gearing causes the pivotable channel to be pivoted between the conveying tracks in such a way upon passage of each article that each conveying track has the same number of articles individually apportioned to it in a constant sequence. Tilting or jamming of articles is said effectively to be avoided and it is said that with the Bauer apparatus it has been possible to distribute over 400 glasses per minute from one line among two lines, which is indicated previously to have been impossible.

SUMMARY OF THE INVENTION

It has now been discovered that it is possible to minimize the risk of product stoppage while maximizing the speed at which product is conveyed through a lane distribution point by employing the mechanism of the present invention. The mechanism is based on the principle that product speed can be maximized by reducing the mechanical linkages and the mechanical travel time needed to switch lanes. In the present invention, changing lanes is accomplished by moving both infeed arms and discharge arms in alternate directions. That is, on the upstream side of the lane distribution point, a lane-forming means comprises infeed arms and on the downstream side of the distribution point, a lane-forming means comprises discharge arms; when it is desired to change lanes, the infeed and discharge arms are moved in alternate directions at substantially the same time. Thus, instead of moving only one lane-forming means on one side of the distribution point, lane-forming means on both sides of the distribution point are moved, which permits reduction in the machine travel distance and which directly reduces the time needed to complete the travel so that the lane divider can achieve higher throughput speeds.

An additional benefit to the apparatus of the invention is that the angle of the turn to which the product is subjected at the lane distribution area is minimized in the present invention as a result of the pivoting of both infeed and discharge arms.

The reduction in travel distance accomplished by the present invention is believed to be at least 25% and most desirably at least 50% of that normally needed to make lane changes.

Movement of both sides of the lane distributor is preferably accomplished by using a single servo motor with rocker arms as the mechanical drive transfer mechanism. Such a single drive component mechanically locks both sides of the divider together so that timing results from the use of a single motor. An advantage of the present apparatus is that no phasing of servo motors or mechanical timing adjustments are required. Use of a single drive component reduces the amount of time required to make the lane change, particularly as compared with an apparatus such as that used by Bauer et al., discussed above. Unlike the Bauer apparatus, the present invention preferably does not employ cams.

The lane distributor of the invention is ideally used to divide a single upstream lane into two downstream lanes. For instance, it may be desirable to do this to create two lanes of product for packaging or other product finishing. As an example, a single lane of recently-produced soap bars can be divided into two lanes for packaging.

The present invention encompasses both lane distribution apparatus and a process for lane distribution wherein the mechanical time and travel needed to switch lanes is reduced. In accordance with the invention, lane changes are preferably carried out in 0.15 seconds or less, e.g., from 0.05 to 0.15 seconds, especially in from 0.08 to 0.1 seconds.

For a more complete understanding of the above and other features and advantages of the invention, reference should be made to the following detailed description of preferred embodiments and to the accompanying drawings.

BRIEF DESCRIPTION OF THE DRAWINGS

FIG. 2 is a top plan view showing the infeed arms, the discharge arms, and the servo motor.

FIG. 3 is a view similar to FIG. 2, except that the infeed arms are aligned with a different lane of the discharge arms.

FIG. 4 illustrates the prior art arrangements wherein the position of only the infeed arms is adjusted when lanes are changed.

DETAILED DESCRIPTION OF THE INVENTION

Figure 1:
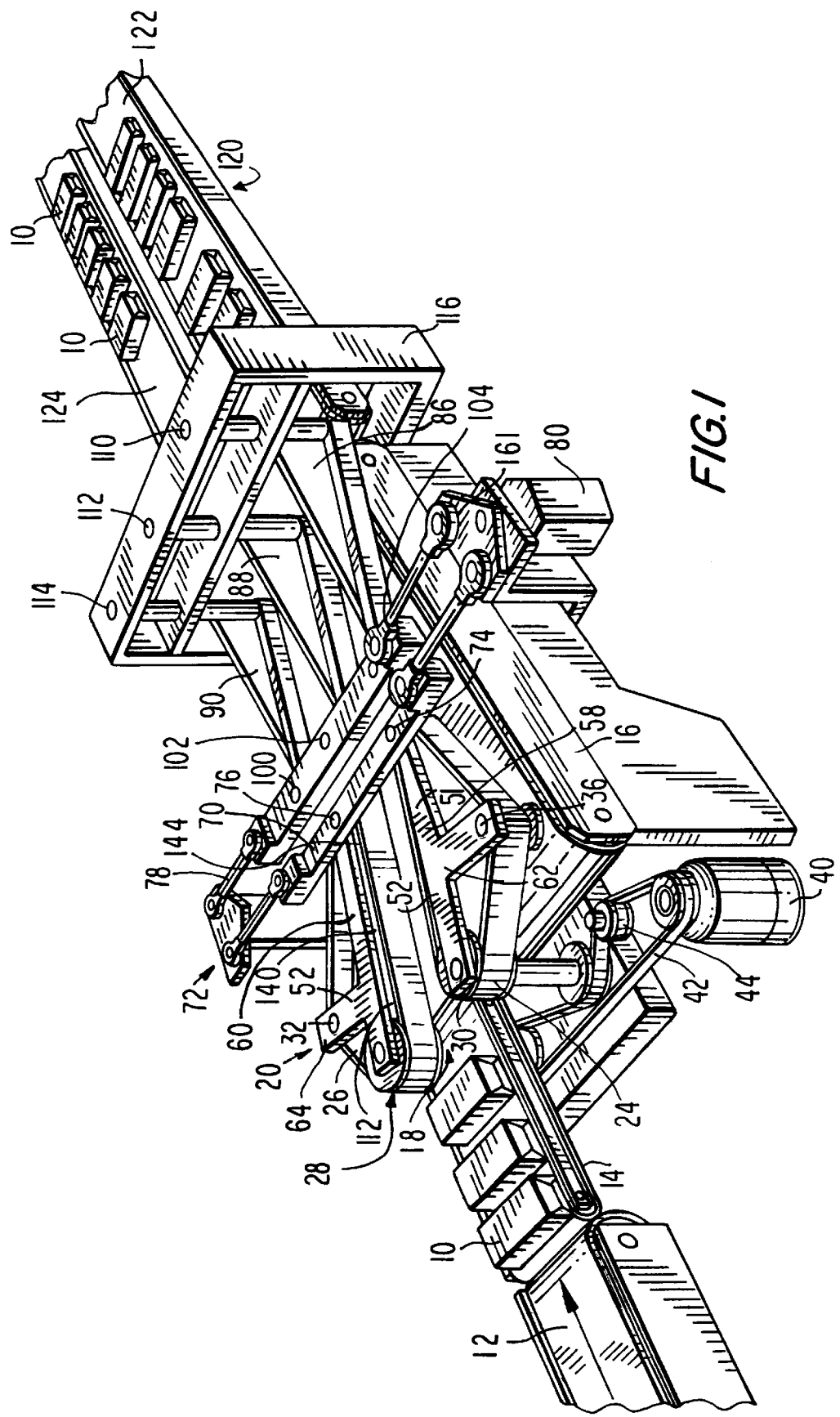
FIG. 1 is a perspective view of the apparatus of the invention

The invention will be illustrated in connection with processing of packaged soap bars. Packages 10 are conveyed on initial feeding belt 12 to second feeding belt 14, which slows conveyance of the packages so that a defined gap will be present between each package. Packages 10 are fed by belt 14 into channel 18 defined by infeed arms 20 and 22. Infeed arms 20 and 22 comprise respectively infeed belts 24 and 26, driving rollers 28, 30 and first following rollers 32, 36. Second following rollers are present in each of the discharge arms, but are obscured in FIG. 1. The infeed belts grip the package received from belt 14.

Drive rollers 28 and 30 are driven by servo motor 40, which also drives belt 42 through idler 44. Alternatively, two separate servo motors may be used to drive the infeed (side) belts.

Each of the rollers in the two discharge arms are journaled in a portion of arm frames 50 and 52. Arm frames 50 and 52 each comprise a longitudinally extending plank 58, 60 having two ends and a perpendicular plank 62, 64 extending perpendicularly to the longitudinally extending plank intermediate the two ends of the longitudinal section. The two longitudinal ends and the end of the perpendicular plank distal to the longitudinal plank define three points of a triangle along which belts 26 and 24 pass when the divider is in operation. The arm frames are typically made of steel or other strong metal. Each of the arm frames are cantilevered at its upstream end.

At the end of the arm frames distal to the point at which packages 10 enter channel 18, the arm frames are associated with first arm 70 of rocker arm mechanism 72, as by rods 74 and 76 extending through both rocker arm 70 and the arm frames 50 and 52. Rocker arm mechanism 72 further comprises second arm 78, which is associated with discharge arms as discussed hereinafter, rocker plate 161 and servo motor 80. Rocker plate 161 and the rocker arms are preferably made of a lightweight metal such as titanium. While FIG. 1 shows two rocker plates, the two rocker arms may be cantilevered and associated with a single plate, as illustrated in FIGS. 2 and 3.

Channel 18 leads to distribution point 84, best seen in schematic diagrams, FIGS. 2–4. Packages released from infeed belts 24, 26 are supported by divider belt 16, which extends from a point just upstream and below the entrance to channel 18 to a point downstream from the distribution point. Downstream of distribution point 84 are discharge arms 86, 88 and 90 defining two discharge channels 92 and 94.

Discharge arms 86, 88 and 90 are associated at their upstream ends with arm 78 of rocker arm 72 by means of rods 100, 102 and 104, which rotate within shafts in arm 78 and arms 86, 88 and 90. The downstream ends of arms 86, 88 and 90 are associated with rods 110, 112 and 114, which pivot in rod-retaining structure 11 6.

Channels 92 and 94 lead in turn to the twin table-top discharge conveyor 120, which comprise lines 122 and 124 leading from channels 94 and 92, respectively.

In operation, packages are conveyed initially over belts 12 and 14 to channel 18. Belt 14 feeds packages 10 into channel 18, where they are gripped by infeed belts 24, 26. They are fed by the infeed belts to divider belt 16. The downstream end of channel 18 is positioned as in FIG. 2 to lead to one of the channels defined by the discharge arms 86, 88 or 88, 90. Belt 16 conveys the packages through the distribution point 84 and through channel 92 or 94, depending on the downstream position of the infeed arms and the upstream position of the discharge arms. The packages then are conveyed by twin table-top discharge conveyor 120 either on line 122 or 124, depending upon the channel of the discharge arms through which the package passes.

Belts 24, 26 are driven by motor 40 and associated rollers and belts.

When it is desired to change the line of conveyor 120 to which the packages are directed, the servo drive 80 is engaged to activate the rocker arm mechanism 72. Upon such engagement, rocker plate 161 will pivot causing arm 70 to move in a direction perpendicular to the direction of travel of the packages, and arm 78 will move in a direction opposite to that of arm 70. The result is that the downstream end of the infeed arms and the upstream ends of the discharge arms are moved in opposite directions simultaneously so that the channel 18 becomes aligned with a different channel of the discharge arms. For instance, as seen in FIGS. 2 and 3, prior to engagement of the servo motor, channel 18 is aligned with channel 92, whereas subsequent to engagement of the motor, channel 18 is aligned with channel 94. as is apparent from FIG.1, movement of the rocker arms is in a single plane.

The present arrangement minimizes the distance and time needed to switch lanes as a result of the movement both of the infeed and discharge arms, in alternate directions. By reducing the machine travel distance, the time needed to complete the machine travel is reduced so that the lane divider can accomplish higher throughput speeds. Moreover, inertia which has to be overcome to change lanes and the time for lane change is reduced as compared to devices such as that of Bauer et al. wherein a cam and additional mechanical linkages are used. The design of the system involves low inertia and achieves maximum acceleration of the lanes during lane changes. In accordance with the present invention, lane changes are preferably effected in from 0.05 to 0.15 seconds, especially from 0.08 to 0.1 seconds, particularly in about 0.08 seconds.

As illustrated in FIGS. 2 and 3, rotation of the servo device of only 13° is required in accordance with the present invention. In contrast, as seen in FIG. 4, a rotation of 26° would be required in some of the prior art devices, wherein only the downstream end of the infeed arms is moved, rather than the present arrangement wherein both the downstream ends of the infeed device and the upstream ends of the discharge device are moved in opposite directions simultaneously.

It is preferred that the walls defining channel 18, i.e., the infeed arms, are spring loaded. Thus, springs 140, 142 and 144 are positioned between frame 60 and belt 26. Likewise, although not shown in FIG. 1, such springs are positioned between belt 24 and frame 52. The springs urge the belt toward channel 18 so as to grasp the package as it enters the channel.

Although the described embodiment is a lane divider, it will be appreciated that the invention may also be used in a lane consolidation device if the number of infeed lanes is greater than the number of discharge lanes.

If desired, servo motor 40 and an electric eye at the distribution point may be used as a check to ensure that no articles are at the distribution point at the time of changing lanes.

It should be understood, of course, that the specific forms of the invention herein illustrated and described are intended to be representative only, as certain changes may be made therein without departing from the clear teachings of the disclosure. Accordingly, reference should be made to the following appended Claims in determining the full scope of the invention.

What is claimed is:

1. A lane distribution apparatus comprising
   a) a first lane-former,
   b) a distribution point downstream of said first lane-former,
   c) a second lane-former downstream of said distribution point,
   d) said second lane-former including more lanes than said first lane-former,
   e) a rocker apparatus for simultaneously adjusting the position of said first and second lane-former from a first position wherein said first lane-former is aligned with one lane of said second lane-former, to a second position wherein said first lane-former is aligned with a second lane of said second lane-former,
   f) said rocker apparatus comprising a rocker plate on a side lateral to said lane distribution apparatus and having a first arm extending from said rocker plate to said first lane-former and a second arm extending from said rocker plate to said second lane-former.

2. The apparatus of claim 1 wherein said apparatus is capable of effecting the lane change in from 0.05 to 0.15 seconds.

3. The apparatus of claim 1 wherein said apparatus is of effecting the lane change in from 0.08 to 0.1 seconds.

4. The apparatus of claim 1 wherein said first lane former comprises one lane and said second lane former comprises two lanes.

5. The apparatus of claim 1 wherein a servo motor is associated with said rocker plate.

6. The apparatus of claim 1 wherein the rocker arms move in a single plane.

7. The apparatus according to claim 1 wherein said rocker apparatus is capable of adjusting the position of the first and second lane former in up to 0.15 seconds.

8. The apparatus of claim 7 wherein said adjustment time of which said apparatus is capable is from 0.08 to 0.1 seconds.

9. The apparatus of claim 7 wherein the adjustment time is from 0.05 to 0.15 seconds.

* * * * *

UNITED STATES PATENT AND TRADEMARK OFFICE
CERTIFICATE OF CORRECTION

PATENT NO. : 5,944,165
DATED : August 31, 1999
INVENTOR(S) : Mannlein et al.

It is certified that error appears in the above-indentified patent and that said Letters Patent is hereby corrected as shown below:

Title page, item [73], Assignee: change

"Lever Brothers Company, New York, N.Y." to --Lever Brothers Company, Division of Conopco, Inc.--

Signed and Sealed this

Twenty-fourth Day of October, 2000

Attest:

Q. TODD DICKINSON

Attesting Officer

Director of Patents and Trademarks